United States Patent
Maki et al.

(10) Patent No.: US 9,496,064 B2
(45) Date of Patent: Nov. 15, 2016

(54) COPPER ALLOY FOR ELECTRIC AND ELECTRONIC DEVICE, COPPER ALLOY SHEET FOR ELECTRIC AND ELECTRONIC DEVICE, CONDUCTIVE COMPONENT FOR ELECTRIC AND ELECTRONIC DEVICE, AND TERMINAL

(71) Applicants: MITSUBISHI MATERIALS CORPORATION, Tokyo (JP); Mitsubishi Shindoh Co., Ltd., Tokyo (JP)

(72) Inventors: Kazunari Maki, Saitama (JP); Hiroyuki Mori, Tsukuba (JP); Daiki Yamashita, Osaka (JP)

(73) Assignees: MITSUBISHI MATERIALS CORPORATION, Tokyo (JP); MITSUBISHI SHINDOH CO., LTD., Tokyo (JP)

(*) Notice: Subject to any disclaimer, the term of this patent is extended or adjusted under 35 U.S.C. 154(b) by 0 days.

(21) Appl. No.: 14/762,324

(22) PCT Filed: Jun. 28, 2013

(86) PCT No.: PCT/JP2013/067814
§ 371 (c)(1),
(2) Date: Jul. 21, 2015

(87) PCT Pub. No.: WO2014/115353
PCT Pub. Date: Jul. 31, 2014

(65) Prior Publication Data
US 2015/0325327 A1  Nov. 12, 2015

(30) Foreign Application Priority Data
Jan. 28, 2013 (JP) ................. 2013-013157

(51) Int. Cl.
| | | |
|---|---|---|
| *H01B 1/02* | (2006.01) | |
| *H01B 5/02* | (2006.01) | |
| *B32B 15/01* | (2006.01) | |
| *B21B 3/00* | (2006.01) | |
| *C22C 9/04* | (2006.01) | |
| *C22F 1/00* | (2006.01) | |
| *C22F 1/08* | (2006.01) | |

(52) U.S. Cl.
CPC ............... *H01B 1/026* (2013.01); *B21B 3/00* (2013.01); *B32B 15/01* (2013.01); *C22C 9/04* (2013.01);
(Continued)

(58) Field of Classification Search
CPC ....................................................... C22C 9/04
See application file for complete search history.

(56) References Cited

U.S. PATENT DOCUMENTS

2011/0223056 A1* 9/2011 Aruga ................. C22C 9/02
420/471

FOREIGN PATENT DOCUMENTS

| JP | 57-005835 A | 1/1982 |
|---|---|---|
| JP | 2004-027331 A | 1/2004 |

(Continued)

OTHER PUBLICATIONS

Lee et al., "Fretting corrosion of tin-plated copper alloy", *IEEE Transactions on Components, Hybrids, and Manufacturing Technology*, Mar. 1987, pp. 63-67, vol. CHMT-10, No. 1.

(Continued)

*Primary Examiner* — Jessee Roe
*Assistant Examiner* — Christopher Kessler
(74) *Attorney, Agent, or Firm* — Leason Ellis LLP (57) ABSTRACT

A copper alloy for electric and electronic devices comprises 23 mass % to 36.5 mass % of Zn; 0.1 mass % to 0.9 mass % of Sn; 0.15 mass % to less than 1.0 mass % of Ni; 0.001 mass % to less than 0.10 mass % of Fe; 0.005 mass % to 0.1 mass % of P; and a balance including Cu and unavoidable impurities, in which $0.002 \leq Fe/Ni < 0.7$, $3 < (Ni+Fe)/P < 15$, and $0.3 < Sn/(Ni+Fe) < 2.9$, are satisfied by atomic ratio, and a fraction R{220} of the X-ray diffraction intensity from the {220} plane is 0.8 or less.

16 Claims, 1 Drawing Sheet

(52) U.S. Cl.
CPC . *H01B 5/02* (2013.01); *C22F 1/00* (2013.01); *C22F 1/08* (2013.01); *Y10T 428/12* (2015.01); *Y10T 428/12715* (2015.01)

(56) References Cited

FOREIGN PATENT DOCUMENTS

| JP | 2007-084920 A | | 4/2007 | |
|---|---|---|---|---|
| JP | 2012158829 | * | 8/2012 | ............... C22C 9/04 |
| WO | WO-2013/103149 A | | 7/2013 | |

OTHER PUBLICATIONS

International Search Report mailed Mar. 12, 2013 for the related PCT Application No. PCT/JP2013/050004.
International Search Report mailed Apr. 3, 2012 for the related PCT Application No. PCT/JP2012/050201.
International Search Report mailed Aug. 6, 2013 for the corresponding PCT Application No. PCT/JP2013/067814.
International Search Report mailed Aug. 6, 2013 for the related PCT Application No. PCT/JP2013/067863.
International Search Report mailed Sep. 3, 2013 for the related PCT Application No. PCT/JP2013/068834.
Office Action mailed May 8, 2014 for the related U.S. Appl. No. 14/114,862.
Office Action mailed Jun. 4, 2014 for the related U.S. Appl. No. 14/114,862.
Office Action mailed Mar. 17, 2016 for the corresponding Chinese Patent Application No. 201380070643.7.
Office Action mailed Aug. 12, 2016 for the corresponding Chinese Patent Application No. 201380070643.7.

* cited by examiner

COPPER ALLOY FOR ELECTRIC AND ELECTRONIC DEVICE, COPPER ALLOY SHEET FOR ELECTRIC AND ELECTRONIC DEVICE, CONDUCTIVE COMPONENT FOR ELECTRIC AND ELECTRONIC DEVICE, AND TERMINAL

CROSS-REFERENCE TO RELATED PATENT APPLICATIONS

This application is a U.S. National Phase Application under 35 U.S.C. §371 of International Patent Application No. PCT/JP2013/067814, filed Jun. 28, 2013, and claims the benefit of Japanese Patent Application No. 2013-013157, filed Jan. 28, 2013, all of which are incorporated by reference in their entirety herein. The International Application was published in Japanese on Jul. 31, 2014 as International Publication No. WO/2014/115353 under PCT Article 21(2).

FIELD OF THE INVENTION

The present invention relates to a Cu—Zn—Sn-based copper alloy for electric and electronic devices, a copper alloy sheet for electric and electronic devices, a conductive component for electric and electronic devices, and a terminal using the same, the copper alloy being used as a conductive component for an electric and electronic device such as a connector of a semiconductor device, other terminals thereof, a movable contact of an electromagnetic relay, or a lead frame.

BACKGROUND OF THE INVENTION

As a material of a conductive component for electric and electronic devices such as connectors and other terminals in semiconductor devices, movable contact of electromagnetic relays, and lead frames, a Cu—Zn alloy is widely used in the related art from the viewpoint of, for example, balance between strength, workability, and cost.

In addition, in the case of a terminal such as a connector, in order to improve reliability of contact with an opposite-side conductive member, a surface of a substrate (blank) formed of a Cu—Zn alloy is plated with tin (Sn). In a conductive component such as a connector obtained by plating a surface of a Cu—Zn alloy as a substrate with Sn, a Cu—Zn—Sn-based alloy in which Sn added to the Cu—Zn alloy may be used in order to improve the recycling efficiency of the Sn-plated substrate and the strength.

Typically, a conductive component for an electric and electronic device such as a connector is manufactured by punching a sheet (rolled sheet) having a thickness of about 0.05 mm to 1.0 mm into a predetermined shape and bending at least a portion of the sheet. In this case, a peripheral portion around the bent portion of conductive component is brought into contact with an opposite-side conductive member so as to obtain an electric connection with the opposite-side conductive member, and due to the spring properties of the bent portion, the contact state with the opposite-side conductive member is maintained.

It is preferable that a copper alloy for an electric and electronic device used for a conductive component for an electric and electronic device is superior in conductivity, rollability, and punchability. Further, as described above, in the case of the copper alloy for the connector or the like in which the contact state between the peripheral portion around the bent portion and the opposite-side conductive member is maintained due to the spring properties of the bent portion obtained by bending, bendability and stress relaxation resistance are required to be superior.

For example, Patent Documents 1 to 3 disclose methods for improving the stress relaxation resistance of a Cu—Zn—Sn-based alloy.

Patent Document 1 describes that stress relaxation resistance can be improved by adding Ni to a Cu—Zn—Sn-based alloy to produce a Ni—P compound. In addition, Patent Document 1 describes that the addition of Fe is also efficient for improvement of stress relaxation resistance.

Patent Document 2 describes that strength, elasticity, and heat resistance can be improved by adding Ni and Fe to a Cu—Zn—Sn-based alloy together with P to produce a compound. The above-described improvement of strength, elasticity, and heat resistance implies improvement of stress relaxation resistance of the copper alloy.

In addition, Patent Document 3 describes that stress relaxation resistance can be improved by adding Ni to a Cu—Zn—Sn-based alloy and adjusting a Ni/Sn ratio to be in a specific range. In addition, Patent Document 3 describes that the addition of a small amount of Fe is also efficient for improving stress relaxation resistance.

Further, Patent Document 4 targeted for a lead frame material describes that stress relaxation resistance can be improved by adding Ni and Fe to a Cu—Zn—Sn-based alloy together with P, adjusting an atomic ratio (Fe+Ni)/P to be in a range of 0.2 to 3, and producing a Fe—P-based compound, a Ni—P-based compound, and a Fe—Ni—P-based compound.

CITATION LIST

Patent Document

[Patent Document 1] Japanese Unexamined Patent Application, First Publication No. H5-33087
[Patent Document 2] Japanese Unexamined Patent Application, First Publication No. 2006-283060
[Patent Document 3] Japanese Patent No. 3953357
[Patent Document 4] Japanese Patent No. 3717321

Technical Problem

However, Patent Documents 1 and 2 consider only each content of Ni, Fe, and P, and the adjustment of each content cannot necessarily realize reliable and sufficient improvement of stress relaxation resistance.

In addition, Patent Document 3 discloses the adjustment of the Ni/Sn ratio but does not consider a relationship between a P compound and stress relaxation resistance at all. Therefore, sufficient and reliable improvement of stress relaxation resistance cannot be realized.

Further, Patent Document 4 only describes the adjustment of the total content of Fe, Ni, and P and the adjustment of the atomic ratio of (Fe+Ni)/P and cannot realize sufficient improvement of stress relaxation resistance.

As described above, with the methods disclosed in the related art, the stress relaxation resistance of a Cu—Zn—Sn-based alloy cannot be sufficiently improved. Therefore, in a connector or the like having the above-described structure, residual stress is relaxed over time or in a high-temperature environment, and contact pressure with an opposite-side conductive member is not maintained. As a result, there is a problem in that a problem such as contact failure is likely to occur in the early stages. In order to avoid such a problem, in the related art, the thickness of a material is inevitably increased, which causes an increase in material cost and weight.

Therefore, more reliable and sufficient improvement in stress relaxation resistance is strongly desired.

Recently, along with a decrease in the size of electric and electronic device, an attempt has been made to decrease the thickness of a conductive component such as a terminal (for example, a connector), a relay, or a lead frame used for the electric and electronic device. Therefore, in the terminal such as a connector, it is necessary that strict bending is performed to secure a contact pressure, and an excellent balance between yield strength and bendability is more necessary than before.

The present invention is made under the above-described circumstances and an object thereof is to provide a copper alloy for an electric and electronic device, a copper alloy sheet for an electric and electronic device using the same, a component for an electric and electronic device and a terminal, the copper alloy having excellent stress relaxation resistance and balance between yield strength and bendability, being capable of having a smaller thickness as material of a component than the conventional alloy.

SUMMARY OF THE INVENTION

Solution to Problem

As a result of extensive experiments and research, the inventors have obtained the following findings. Appropriate amounts of Ni and Fe are added and an appropriate amount of P is added to the Cu—Zn—Sn-based alloy, and a ratio Fe/Ni of a Fe content to a Ni content, a ratio (Ni+Fe)/P of a total content (Ni+Fe) of Ni and Fe to a P content, and a ratio Sn/(Ni+Fe) of a Sn content to a total content (Ni+Fe) of Ni and Fe are controlled to be in appropriate ranges by atomic ratio, thereby, appropriately precipitating precipitates containing Fe, Ni and P. In addition to that, the X-ray diffraction intensity ratio of a {220} plane on the surface of a sheet or a strip is specified. Thus, it is possible to obtain a copper alloy having reliably and sufficiently improved stress relaxation resistance, and excellent strength and bendability. The present invention has been made based on the above-described findings.

Further, the inventors have found that the stress relaxation resistance and strength could be further improved by adding an appropriate amount of Co with the above-described Ni, Fe, and P.

According to a first aspect of the present invention, there is provided a copper alloy for electric and electronic devices, the copper alloy comprising: 23 mass % to 36.5 mass % of Zn; 0.1 mass % to 0.9 mass % of Sn; 0.15 mass % to less than 1.0 mass % of Ni; 0.001 mass % to less than 0.10 mass % of Fe; 0.005 mass % to 0.1 mass % of P; and a balance including Cu and unavoidable impurities, in which a ratio Fe/Ni of a Fe content to a Ni content satisfies 0.002≤Fe/Ni<0.7 by atomic ratio, a ratio (Ni+Fe)/P of a total content (Ni+Fe) of Ni and Fe to a P content satisfies 3<(Ni+Fe)/P<15 by atomic ratio, a ratio Sn/(Ni+Fe) of a Sn content to the total content (Ni+Fe) of Ni and Fe satisfies 0.3<Sn/(Ni+Fe)<2.9 by atomic ratio, and R{220} is 0.8 or less, wherein an X-ray diffraction intensity from a {111} plane on a surface of the copper alloy is represented by I{111}, an X-ray diffraction intensity from a {200} plane on the surface of the copper alloy is represented by I{200}, an X-ray diffraction intensity from a {220} plane on the surface of the copper alloy is represented by I{220}, an X-ray diffraction intensity from a {311} plane on the surface of the copper alloy is represented by I{311}, and a fraction R{220} of the X-ray diffraction intensity from the {220} plane on the surface of the copper alloy is R{220}=I{220}/(I{111}+I{200}+I{220}+I{311}).

Note that, the above-described X-ray diffraction intensity refers to the X-ray diffraction intensity from an α phase which is a matrix of copper alloy.

According to the copper alloy for an electric and electronic device having the above-described configuration, Ni and Fe are added thereto together with P, and addition ratios between Sn, Ni, Fe, and P are limited, and thereby an [Ni,Fe]—P-based precipitate containing Fe and/or Ni and P which is precipitated from a matrix (mainly composed of α phase) is present in an appropriate amount. In addition, the X-ray diffraction intensity ratio R{220} of the {220} plane on a surface of a body of the copper alloy is limited to 0.8 or less. As a result, stress relaxation resistance is sufficiently superior, strength (yield strength) is high, and bendability is also superior.

Here, the [Ni,Fe]—P-based precipitate refers to a ternary precipitate of Ni—Fe—P or a binary precipitate of Fe—P or Ni—P, and may include a multi-component precipitate containing the above-described elements and other elements, for example, major components such as Cu, Zn, and Sn and impurities such as O, S, C, Co, Cr, Mo, Mn, Mg, Zr, and Ti. In addition, the [Ni,Fe]—P-based precipitate is present in the form of a phosphide or a solid-solution alloy containing phosphorus.

According to a second aspect of the present invention, there is provided a copper alloy for an electric and electronic device, the copper alloy comprising: 23 mass % to 36.5 mass % of Zn; 0.1 mass % to 0.9 mass % of Sn; 0.15 mass % to less than 1.0 mass % of Ni; 0.001 mass % to less than 0.10 mass % of Fe; 0.001 mass % to less than 0.1 mass % of Co; 0.005 mass % to 0.1 mass % of P; and a balance including Cu and unavoidable impurities, in which a ratio (Fe+Co)/Ni of a total content of Fe and Co to a Ni content satisfies 0.002≤(Fe+Co)/Ni<0.7 by atomic ratio, a ratio (Ni+Fe+Co)/P of a total content (Ni+Fe+Co) of Ni, Fe, and Co to a P content satisfies 3<(Ni+Fe+Co)/P<15 by atomic ratio, a ratio Sn/(Ni+Fe+Co) of a Sn content to the total content (Ni+Fe+Co) of Ni, Fe, and Co satisfies 0.3<Sn/(Ni+Fe+Co)<2.9 by atomic ratio, and R{220} is 0.8 or less, wherein an X-ray diffraction intensity from a {111} plane on a surface of the copper alloy is represented by I{111}, an X-ray diffraction intensity from a {200} plane on the surface of the copper alloy is represented by I{200}, an X-ray diffraction intensity from a {220} plane on the surface of the copper alloy is represented by I{220}, an X-ray diffraction intensity from a {311} plane on the surface of the copper alloy is represented by I{311}, and a fraction R{220} of the X-ray diffraction intensity from the {220} plane on the surface of the copper alloy is R{220}=I{220}/(I{111}+I{200}+I{220}+I{311}).

Note that, the above-described X-ray diffraction intensity refers to the X-ray diffraction intensity from an α phase which is a matrix of a copper alloy.

The copper alloy according to the second aspect is the copper alloy according to the first aspect further including 0.001 mass % to less than 0.1 mass % of Co, in which the ratio (Fe+Co)/Ni of a total content of Fe and Co to a Ni content satisfies (Fe+Co)/Ni<0.7 by atomic ratio, the ratio (Ni+Fe+Co)/P of a total content (Ni+Fe+Co) of Ni, Fe, and Co to a P content satisfies (Ni+Fe+Co)/P<15 by atomic ratio, and the ratio Sn/(Ni+Fe+Co) of a Sn content to the total content (Ni+Fe+Co) of Ni, Fe, and Co satisfies 0.3<Sn/(Ni+Fe+Co) by atomic ratio.

According to the copper alloy for an electric and electronic device having the above-described configuration, Ni, Fe, and Co are added thereto together with P, and addition ratios between Sn, Ni, Fe, Co, and P are appropriately limited. As a result, an [Ni,Fe,Co]—P-based precipitate containing P and at least one element selected from Fe, Ni and Co which is precipitated from a matrix (mainly composed of α phase) is present in an appropriate amount. In addition to that, the X-ray diffraction intensity ratio R{220} of the {220} plane on a surface of a body of the copper alloy is limited to 0.8 or less. Therefore, stress relaxation resistance is sufficiently superior, strength (yield strength) is high, and bendability is also superior.

Here, the [Ni,Fe,Co]—P-based precipitate refers to a quaternary precipitate of Ni—Fe—Co—P, a ternary precipitate of Ni—Fe—P, Ni—Co—P, or Fe—Co—P, or a binary precipitate of Fe—P, Ni—P, or Co—P and may include a multi-component precipitate containing the above-described elements and other elements, for example, major components such as Cu, Zn, and Sn and impurities such as O, S, C, Cr, Mo, Mn, Mg, Zr, and Ti. In addition, the [Ni,Fe,Co]—P-based precipitate is present in the form of a phosphide or an solid-solution alloy containing phosphorus.

The copper alloy according to the first or second aspect is a rolled material in which a surface (rolled surface) thereof may satisfy the above-described conditions of the X-ray diffraction intensity on the surface of the copper alloy. For example, the above-described rolled material may have a form of a sheet or a strip and the surface of the sheet or the strip may satisfy the above-described conditions of the X-ray diffraction intensity on the surface of the copper alloy.

In the copper alloy for an electric and electronic device according to the first or second aspect, it is preferable that the copper alloy has mechanical properties including a 0.2% yield strength of 300 MPa or higher.

The copper alloy for an electric and electronic device, which has mechanical properties including the 0.2% yield strength of 300 MPa or higher, is suitable for a conductive component in which high strength is particularly required, for example, a movable contact of an electromagnetic relay or a spring portion of a terminal.

According to a third aspect of the present invention, there is provided a copper alloy sheet for an electric and electronic device including: a sheet main body made of a rolled material formed of the copper alloy for an electric and electronic device according to the first or second aspect, in which a thickness of the sheet main body is in a range of 0.05 mm to 1.0 mm. Note that, the copper alloy sheet main body may be a sheet (tape-shaped copper alloy) having a strip form.

The copper alloy sheet for an electric and electronic device having the above-described configuration can be suitably used for a connector, other terminals, a movable contact of an electromagnetic relay, or a lead frame.

In the copper alloy sheet for an electric and electronic device, on a surface of the sheet main body, it is possible to make the X-ray diffraction intensity from the {111} plane, the X-ray diffraction intensity from the {200} plane, the X-ray diffraction intensity from the {220} plane, and the X-ray diffraction intensity from the {311} plane of the matrix (a phase) satisfy the condition R{220}=I{220}/(I{111}+I{200}+I{220}+I{311}) described in the first or second aspect.

In the copper alloy sheet for an electric and electronic device, the surface of the sheet main body may be plated with Sn. That is, the copper alloy sheet may include a sheet main body (substrate) and a Sn-plated layer formed on the surface of the sheet main body. A single surface or both surfaces of the sheet main body may be plated with Sn.

In this case, a substrate to be plated with Sn is formed of a Cu—Zn—Sn-based alloy containing 0.1 mass % to 0.9 mass % of Sn. Therefore, a component such as a connector after use can be collected as scrap of a Sn-plated Cu—Zn alloy, and superior recycling efficiency can be secured.

According to a fourth aspect of the present invention, there is provided a conductive component for an electric and electronic device including: the above-described copper alloy for an electric and electronic device.

According to a fifth aspect of the present invention, there is provided a conductive component for an electric and electronic device including: the above-described copper alloy sheet for an electric and electronic device.

Examples of the conductive component for an electric and electronic device according to the present invention include a terminal, a connector, a relay, a lead frame, and the like.

According to a sixth aspect of the present invention, there is provided a terminal including: the above-described copper alloy for an electric and electronic device.

Further, according to a seventh aspect of the present invention, there is provided a terminal including: the above-described copper alloy sheet for an electric and electronic device.

Examples of the terminal according to the present invention include a connector.

According to the conductive component for an electric and electronic device and the terminal having the above-described configurations, stress relaxation resistance is superior. Therefore, residual stress is not likely to be relaxed over time or in a high-temperature environment. For example, when the conductive component and the terminal have a structure of coming into press contact with an opposite-side conductive member due to the spring properties of a bent portion, the contact pressure with the opposite-side conductive member can be maintained. In addition, the thickness of the conductive component for an electric and electronic device and terminal can be reduced.

Advantageous Effects of Invention

According to the present invention, it is possible to provide a copper alloy for an electric and electronic device, a copper alloy sheet for an electric and electronic device, a conductive component for an electric and electronic device, and a terminal using the same, in which the copper alloy has excellent stress relaxation resistance and balance between yield strength and bendability, and is capable of having a smaller thickness as material of a component than the conventional alloy.

DETAILED DESCRIPTION OF THE INVENTION

Hereinafter, a copper alloy for an electric and electronic device according to an embodiment of the present invention will be described.

The copper alloy for an electric and electronic device according to the embodiment has a composition comprising: 23 mass % to 36.5 mass % of Zn; 0.1 mass % to 0.9 mass % of Sn; 0.15 mass % to less than 1.0 mass % of Ni; 0.001 mass % to less than 0.10 mass % of Fe; 0.005 mass % to 0.1 mass % of P; and a balance including Cu and unavoidable impurities.

Content ratios between the respective alloy elements are determined such that a ratio Fe/Ni of a Fe content to a Ni content satisfies the following Expression (1) of 0.002≤Fe/Ni<0.7 by atomic ratio, a ratio (Ni+Fe)/P of a total content (Ni+Fe) of Ni and Fe to a P content satisfies the following Expression (2) of 3<(Ni+Fe)/P<15 by atomic ratio, and a ratio Sn/(Ni+Fe) of a Sn content to the total content (Ni+Fe) of Ni and Fe satisfies the following Expression (3) of 0.3<Sn/(Ni+Fe)<2.9 by atomic ratio.

Further, the copper alloy for an electric and electronic device according to the embodiment may further include 0.001 mass % to less than 0.10 mass % of Co in addition to Zn, Sn, Ni, Fe, and P described above. In this case, the Fe content is set to be in a range of 0.001 mass % or more and less than 0.10 mass %.

Content ratios between the respective alloy elements are determined such that a ratio (Fe+Co)/Ni of a total content of Fe and Co to a Ni content satisfies the following Expression (1') of 0.002≤(Fe+Co)/Ni<0.7 by atomic ratio, a ratio (Ni+Fe+Co)/P of a total content (Ni+Fe+Co) of Ni, Fe, and Co to a P content satisfies the following Expression (2') of 3<(Ni+Fe+Co)/P<15 by atomic ratio, and a ratio Sn/(Ni+Fe+Co) of a Sn content to the total content (Ni+Fe+Co) of Ni, Fe, and Co satisfies the following Expression (3') of 0.3<Sn/(Ni+Fe+Co)<2.9 by atomic ratio.

Note that, the copper alloy satisfying Expressions (1), (2), and (3) further includes 0.001 mass % to less than 0.10 mass % of Co, the ratio (Fe+Co)/Ni of a total content of Fe and Co to a Ni content satisfies (Fe+Co)/Ni<0.7 by atomic ratio, the ratio (Ni+Fe+Co)/P of a total content (Ni+Fe+Co) of Ni, Fe, and Co to a P content satisfies (Ni+Fe+Co)/P<15 by atomic ratio, and the ratio Sn/(Ni+Fe+Co) of a Sn content to the total content (Ni+Fe+Co) of Ni, Fe, and Co satisfies 0.3<Sn/(Ni+Fe+Co) by atomic ratio, accordingly Expressions (1'), (2'), and (3') are satisfied.

Here, the reasons for limiting the component composition as described above will be described.

Zinc (Zn): 23 mass % to 36.5 mass %

Zn is a basic alloy element in the copper alloy, which is a target of the embodiment and is an efficient element for improving strength and spring properties. In addition, Zn is cheaper than Cu and thus has an effect of reducing the material cost of the copper alloy. When the Zn content is less than 23 mass %, the effect of reducing the material cost cannot be sufficiently obtained. On the other hand, when the Zn content exceeds 36.5 mass %, corrosion resistance decreases, and cold workability of the copper alloy also decreases.

Therefore, in the embodiment, the Zn content is in a range of 23 mass % to 36.5 mass %. The Zn content is preferably in a range of 23 mass % to 33 mass %, and more preferably in a range of 23 mass % to 30 mass %.

Tin (Sn): 0.1 mass % to 0.9 mass %

Addition of Sn has an effect of improving strength of the copper alloy and is advantageous for improving the recycling efficiency of a Sn-plated Cu—Zn alloy. Further, as a result of a study by the present inventors, it was found that the presence of Sn together with Ni and Fe contributes to the improvement of stress relaxation resistance of the copper alloy. When the Sn content is less than 0.1 mass %, the above-described effects cannot be sufficiently obtained. On the other hand, when the Sn content is more than 0.9 mass %, hot workability and cold workability of the copper alloy decrease. Therefore, cracking may occur during hot rolling or cold rolling of the copper alloy, and conductivity may decrease.

Therefore, in the embodiment, the Sn content is in a range of 0.1 mass % to 0.9 mass %. The Sn content is more preferably in a range of 0.2 mass % to 0.8 mass %.

Nickel (Ni): 0.15 mass % to less than 1.0 mass %

By adding Ni together with Fe and P, a [Ni,Fe]—P-based precipitate can be precipitated from a matrix (mainly composed of α phase) of the copper alloy. In addition, by adding Ni together with Fe, Co, and P, a [Ni,Fe,Co]—P-based precipitate can be precipitated from a matrix (mainly composed of α phase) of the copper alloy. The [Ni,Fe]—P-based precipitate or the [Ni,Fe,Co]—P-based precipitate has an effect of pinning grain boundaries during recrystallization. As a result, the average grain size can be reduced, and strength, bendability, and stress corrosion cracking resistance of the copper alloy can be improved. Further, due to the presence of the precipitate, stress relaxation resistance of the copper alloy can be significantly improved. Further, by allowing Ni to be present together with Sn, Fe, Co, and P, stress relaxation resistance of the copper alloy can be improved due to solid solution strengthening. Here, when the addition amount of Ni is less than 0.15 mass %, stress relaxation resistance cannot be sufficiently improved. On the other hand, when the addition amount of Ni is 1.0 mass % or more, the solid solution amount of Ni increases, and conductivity decreases. In addition, due to an increase in the amount of an expensive Ni material used, the cost increases.

Therefore, in the embodiment, the Ni content is in a range of 0.15 mass % to less than 1.0 mass %. The Ni content is more preferably in a range of 0.2 mass % to less than 0.8 mass %.

Iron (Fe): 0.001 mass % to less than 0.10 mass %

By adding Fe together with Ni and P, a [Ni,Fe]—P-based precipitate can be precipitated from a matrix (mainly composed of α phase) of the copper alloy. In addition, by adding Fe together with Ni, Co, and P, a [Ni,Fe,Co]—P-based precipitate can be precipitated from a matrix (mainly composed of α phase) of the copper alloy. The [Ni,Fe]—P-based precipitate or the [Ni,Fe,Co]—P-based precipitate has an effect of pinning grain boundaries during recrystallization. As a result, the average grain size can be reduced, and strength, bendability, and stress corrosion cracking resistance of the copper alloy can be improved. Further, due to the presence of the precipitate, stress relaxation resistance of the copper alloy can be significantly improved. Here, when the addition amount of Fe is less than 0.001 mass %, the effect of pinning grain boundaries cannot be sufficiently obtained, and sufficient strength cannot be obtained. On the other hand, when the addition amount of Fe is 0.10 mass % or more, further improvement of strength cannot be recognized, the solid solution amount of Fe increases, and conductivity of the copper alloy decreases. In addition, cold rollability decreases.

Therefore, in the embodiment, the Fe content is in a range of 0.001 mass % to less than 0.10 mass %. The Fe content is more preferably in a range of 0.002 mass % to 0.08 mass %.

Cobalt (Co): 0.001 mass % to less than 0.10 mass %

Co is not an essential addition element. However, when a small amount of Co is added together with Ni, Fe, and P, a [Ni,Fe,Co]—P-based precipitate is produced, and stress relaxation resistance of the copper alloy can be further improved. Here, when the addition amount of Co is less than 0.001 mass %, the effect of further improving stress relaxation resistance obtained by the addition of Co cannot be obtained. On the other hand, when the addition amount of Co is 0.10 mass % or more, the solid solution amount of Co increases, and conductivity of the copper alloy decreases. In addition, due to an increase in the amount of an expensive Co material used, the cost increases.

Therefore, in the embodiment, when Co is added, the Co content is in a range of 0.001 mass % to less than 0.10 mass %. The Co content is more preferably in a range of 0.002 mass % to 0.08 mass %. When Co is not actively added, less than 0.001 mass % of Co is contained as an impurity.

Phosphorous (P): 0.005 mass % to 0.10 mass %

P has high bonding properties with Fe, Ni, and Co. When an appropriate amount of P is added together with Fe and Ni, a [Ni,Fe]—P-based precipitate can be precipitated. In addition, when an appropriate amount of P is added together with Fe, Ni, and Co, a [Ni,Fe,Co]—P-based precipitate can be precipitated. Further, due to the presence of the precipitate, stress relaxation resistance of the copper alloy can be improved. When the P content is less than 0.005 mass %, it is difficult to precipitate a sufficient amount of the [Ni,Fe]—P-based precipitate or the [Ni,Fe,Co]—P-based precipitate, and stress relaxation resistance of the copper alloy cannot be sufficiently improved. On the other hand, when the P content exceeds 0.10 mass %, the solid solution amount of P increases, conductivity decreases, rollability decreases, and cold rolling cracking is likely to occur.

Therefore, in the embodiment, the P content is in a range of 0.005 mass % to 0.10 mass %. The P content is more preferably in a range of 0.01 mass % to 0.08 mass %.

P is an element which is likely to be unavoidably incorporated into molten raw materials of the copper alloy. Accordingly, in order to limit the P content to be as described above, it is desirable to appropriately select the molten raw materials.

Basically, the balance of the above-described elements may include Cu and unavoidable impurities. Examples of the unavoidable impurities include Mg, Al, Mn, Si, (Co), Cr, Ag, Ca, Sr, Ba, Sc, Y, Hf, V, Nb, Ta, Mo, W, Re, Ru, Os, Se, Te, Rh, Ir, Pd, Pt, Au, Cd, Ga, In, Li, Ge, As, Sb, Ti, Tl, Pb, Bi, Be, N, Hg, B, Zr, rare earth element, and the like. The total amount of the unavoidable impurities is preferably 0.3 mass % or less.

Further, in the copper alloy for an electric and electronic device according to the embodiment, it is important not only to adjust each content of the alloy elements to be in the above-described range, but also to limit the ratios between the respective content of the elements such that the above-described Expressions (1) to (3) or Expressions (1') to (3') are satisfied by atomic ratio. Therefore, the reason for limiting the ratios to satisfy Expressions (1) to (3) or Expressions (1') to (3') will be described below.

$$0.002 \leq Fe/Ni < 0.7 \qquad \text{Expression (1):}$$

As a result of a detailed experiment, the present inventors found that sufficient improvement of stress relaxation resistance can be realized not only by adjusting each content of Fe and Ni as described above but also by limiting the ratio Fe/Ni to be in a range of 0.002 to less than 0.7 by atomic ratio. Here, when the ratio Fe/Ni is 0.7 or more, stress relaxation resistance of the copper alloy decreases. When the ratio Fe/Ni is less than 0.002, strength of the copper alloy decreases, and the amount of an expensive Ni material used is relatively increased, which causes an increase in cost. Therefore, the ratio Fe/Ni is limited to be in the above-described range.

The Fe/Ni ratio is particularly preferably in the range of 0.002 to 0.5.

$$3 < (Ni+Fe)/P < 15 \qquad \text{Expression (2):}$$

When the ratio (Ni+Fe)/P is 3.0 or less, stress relaxation resistance of the copper alloy decreases along with an increase in the ratio of solid-solution element P. Concurrently, conductivity decreases due to the solid-solution element P, rollability decreases, and thus cold rolling cracking is likely to occur. Further, bendability decreases. On the other hand, when the ratio (Ni+Fe)/P is 15 or more, conductivity of the copper alloy decreases along with an increase in the ratio of solid-solution elements Ni and Fe, and the amount of an expensive Ni material used is relatively increased, which causes an increase in cost. Therefore, the ratio (Ni+Fe)/P is limited to be in the above-described range. Note that, even in the above-described range, the (Ni+Fe)/P ratio is, preferably set to be in a range of more than 3 to 12.

$$0.3 < Sn/(Ni+Fe) < 2.9 \qquad \text{Expression (3):}$$

When the ratio Sn/(Ni+Fe) is 0.3 or less, the effect of improving stress relaxation resistance cannot be sufficiently exhibited. On the other hand, when the ratio Sn/(Ni+Fe) is 2.9 or more, the (Ni+Fe) content is relatively decreased, the amount of a [Ni,Fe]—P-based precipitate decreases, and stress relaxation resistance of the copper alloy decreases. Therefore, the ratio Sn/(Ni+Fe) is limited to be in the above-described range. Note that, even in the above-described range, the Sn/(Ni+Fe) ratio is, particularly, preferably set to be in a range of more than 0.3 to 1.5.

$$0.002 \leq (Fe+Co)/Ni < 0.7 \qquad \text{Expression (1'):}$$

When Co is added, it can be considered that a portion of Fe is substituted with Co, and Expression (1') basically corresponds to Expression (1). Here, when the ratio (Fe+Co)/Ni is 0.7 or more, stress relaxation resistance of the copper alloy decreases, and the amount of an expensive Co material used increases, which causes an increase in cost. When the ratio (Fe+Co)/Ni is less than 0.002, strength of the copper alloy decreases, and the amount of an expensive Ni material used is relatively increased, which causes an increase in cost. Therefore, the ratio (Fe+Co)/Ni is limited to be in the above-described range. The (Fe+Co)/Ni ratio is particularly preferably in a range of 0.002 to 0.5.

$$3 < (Ni+Fe+Co)/P < 15 \qquad \text{Expression (2'):}$$

Expression (2'), which expresses the case where Co is added, corresponds to Expression (2). When the ratio (Ni+Fe+Co)/P is 3 or less, stress relaxation resistance decreases along with an increase in the ratio of solid-solution element P. Concurrently, conductivity of the copper alloy decreases due to the solid-solution element P, rollability decreases, and thus cold rolling cracking is likely to occur. Further, bendability decreases. On the other hand, when the ratio (Ni+Fe+Co)/P is 15 or more, conductivity of the copper alloy decreases along with an increase in the ratio of solid-solution elements Ni, Fe, and Co, and the amount of an expensive Co or Ni material used is relatively increased, which causes an increase in cost. Therefore, the ratio (Ni+Fe+Co)/P is limited to be in the above-described range. Note that, even in the above-described range, the (Ni+Fe+Co)/P ratio is preferably set to be in a range of more than 3 to 12.

$$0.3 < Sn/(Ni+Fe+Co) < 2.9 \qquad \text{Expression (3'):}$$

Expression (3'), which expresses the case where Co is added, corresponds to Expression (3). When the ratio Sn/(Ni+Fe+Co) is 0.3 or less, the effect of improving stress relaxation resistance cannot be sufficiently exhibited. On the other hand, when the ratio Sn/(Ni+Fe+Co) is 2.9 or more, the (Ni+Fe+Co) content is relatively decreased, the amount of a [Ni,Fe,Co]—P-based precipitate decreases, and stress relaxation resistance of the copper alloy decreases. Therefore, the ratio Sn/(Ni+Fe+Co) is limited to be in the above-described range. Note that, even in the above-described range, the Sn/(Ni+Fe+Co) ratio is preferably set to be in a range of more than 0.3 to 1.5.

As described above, in the copper alloy for an electric and electronic device in which not only each content of the respective alloy elements but also the ratios between the elements are adjusted so as to satisfy Expressions (1) to (3) or Expressions (1') to (3'), a [Ni,Fe]—P-based precipitate or a [Ni,Fe,Co]—P-based precipitate is dispersed and precipitated from a matrix (mainly composed of α phase). It is presumed that, due to the dispersion and precipitation of the precipitate, stress relaxation resistance is improved.

Further, in the copper alloy for an electric and electronic device according to the embodiment, the presence of the [Ni,Fe]—P-based precipitate or the [Ni,Fe,Co]—P-based precipitate is important. As a result of a study by the present inventors, it was found that the precipitate is a hexagonal crystal (space group: P-62 m (189)) having a $Fe_2P$-based or $Ni_2P$-based crystal structure, or a $Fe_2P$-based orthorhombic crystal (space group: P-nma (62)). It is preferable that the precipitate have a fine average grain size of 100 nm or less. Due to the presence of the precipitate having a fine grain size, superior stress relaxation resistance can be secured, and strength and bendability can be improved through grain refinement. Here, when the average grain size of the precipitate exceeds 100 nm, contribution to the improvement of strength and stress relaxation resistance decreases.

In addition, in the copper alloy for an electric and electronic device of the present embodiment, the component composition is not only adjusted as described above but the X-ray diffraction intensity ratio of the matrix (α-phase) on the surface of a sheet (the surface of a sheet member or the surface of a strip) is regulated as described below.

That is, R{220} is set to be 0.8 or less, wherein the X-ray diffraction intensity from a {111} plane on the surface of the sheet is represented by I{111}, the X-ray diffraction intensity from a {200} plane is represented by I{200}, the X-ray diffraction intensity from a {220} plane is represented by I{220}, the X-ray diffraction intensity from a {311} plane is represented by I{311}, and the fraction R{220} of the X-ray diffraction intensity from the {220} plane is set to R{220}=I{220}/(I{111}+I{200}+I{220}+I{311}).

Hereinafter, the reasons for regulating the X-ray diffraction intensity ratio on the surface of a sheet as described above will be described.

(X-Ray Diffraction Intensity Ratio)

The {220} plane on the surface (for example, the surface of a sheet member) has a rolling texture and, when the fraction of the {220} plane increases, when a bending is carried out in a direction perpendicular to the rolling direction, an orientation relationship is obtained in which the slip system cannot easily act with respect to the stress direction of the bending. Therefore, the copper alloy is locally deformed during the bending. This local deformation may cause cracking.

Therefore, it is considered that, when the fraction R{220} of the X-ray diffraction intensity from the {220} plane on a surface of a sheet is limited to 0.8 or less, the occurrence of cracking can be reduced and bendability improves. The fraction R{220} of the X-ray diffraction intensity from the {220} plane is preferably 0.7 or less even in the above-described range.

Note that, the lower limit of the fraction R{220} of the X-ray diffraction intensity from the {220} plane is not particularly specified, but is preferably set to be 0.3 or more.

Figure 1:
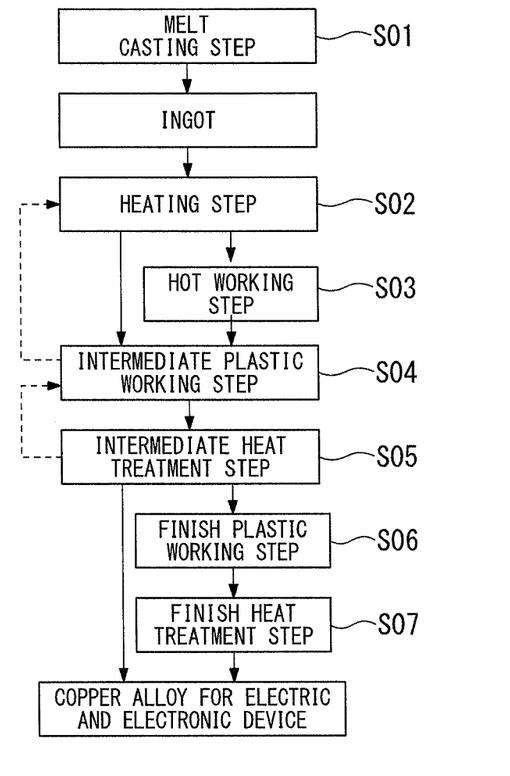
FIG. 1 is a flow chart showing a process example of a method of producing a copper alloy for an electric and electronic device according to the present invention.

Next, a preferable example of a method of producing the above-described copper alloy for an electric and electronic device according to the embodiment will be described with reference to a flowchart shown FIG. 1.

[Melt Casting Step: S01]

First, molten copper alloy having the above-described component composition is prepared. As a copper material, 4NCu (for example, oxygen-free copper) having a purity of 99.99% or higher is preferably used, and scrap may also be used as the material. In addition, for melting, an air atmosphere furnace may be used. However, in order to suppress oxidation of an addition element, an atmosphere furnace having an inert gas atmosphere or a reducing atmosphere may be used.

Next, the molten copper alloy with the components adjusted is cast into an ingot using an appropriate casting method such as a batch type casting method (for example, metal mold casting), a continuous casting method, or a semi-continuous casting method.

[Heating Step: S02]

Next, optionally, a homogenization heat treatment is performed to eliminate segregation of the ingot and homogenize the ingot structure. Alternatively, a solution heat treatment is performed to solid-solute a crystallized product or a precipitate. Heat treatment conditions are not particularly limited. Typically, heating may be performed at 600° C. to 1000° C. for 1 second to 24 hours. When the heat treatment temperature is lower than 600° C. or when the heat treatment time is shorter than 5 minutes, a sufficient effect of homogenizing or solutionizing may not be obtained. On the other hand, when the heat treatment temperature exceeds 1000° C., a segregated portion may be partially melted. When the heat treatment time exceeds 24 hours, the cost increases. Cooling conditions after the heat treatment may be appropriately determined. Typically, water quenching may be performed. After the heat treatment, surface polishing may be performed.

[Hot Working: S03]

Next, hot working may be performed on the ingot to optimize rough processing and homogenize the structure. Hot working conditions are not particularly limited. Typically, it is preferable that the start temperature is 600° C. to 1000° C., the end temperature is 300° C. to 850° C., and the working ratio is about 10% to 99%. Until the start temperature of the hot working, ingot heating may be performed as the above-described heating step S02. Cooling conditions after the hot working may be appropriately determined. Typically, water quenching may be performed. After the hot working, surface polishing may be performed. A working method of the hot working is not particularly limited. In a case in which the final shape of the product is a plate or a strip, hot rolling may be applied. In addition, in a case in which the final shape of the product is a wire or a rod, extrusion or groove rolling may be applied. Further, in a case in which the final shape of the product is a bulk shape, forging or pressing may be applied.

[Intermediate Plastic Working: S04]

Next, intermediate plastic working is performed on the ingot which undergoes the homogenization treatment in the heating step S02 or the hot working material which undergoes the hot working S03 such as hot rolling. In the intermediate plastic working S04, temperature conditions are not particularly limited and are preferably in a range of −200° C. to +200° C. of a cold or warm working temperature. The working ratio of the intermediate plastic working is not particularly limited and is typically about 10% to 99%. An working method is not particularly limited. In a case in which the final shape of the product is a plate or a strip, rolling may be applied. In addition, in a case in which the final shape of the product is a wire or a rod, extrusion or groove rolling may be applied. Further, in a case in which the final shape of the product is a bulk shape, forging or pressing may be applied. S02 to S04 may be repeated to strictly perform solutionizing.

[Intermediate Heat Treatment Step: S05]

After the intermediate plastic working S04 at a cold or warm working temperature, an intermediate heat treatment is performed as a recrystallization treatment and a precipitation treatment. This intermediate heat treatment is performed not only to recrystallize the structure but also to disperse and precipitate a [Ni,Fe]—P-based precipitate or a [Ni,Fe,Co]—P-based precipitate. Conditions of the heating temperature and the heating time may be adopted to produce the precipitate. Typically, the conditions may be 200° C. to 800° C. and 1 second to 24 hours. However, the grain size affects stress relaxation resistance to some extent. Therefore, it is preferable that the grain size of crystal grains recrystallized by the intermediate heat treatment is measured to appropriately select conditions of the heating temperature and the heating time. The intermediate heat treatment and the subsequent cooling affect the final average grain size. Therefore, it is preferable that the conditions are selected such that the average grain size of the α phase is in a range of 0.1 μm to 50 μm.

As a specific method of the intermediate heat treatment, a method using a batch type heating furnace or a continuous heating method using a continuous annealing line may be used. When the batch type heating furnace is used, it is preferable that heating is performed at a temperature of 300° C. to 800° C. for 5 minutes to 24 hours. In addition, when the continuous annealing line is used, it is preferable that the heating maximum temperature is set as 250° C. to 800° C., and the temperature is not kept or only kept for about 1 second to 5 minutes in the above temperature range. In addition, it is preferable that the atmosphere of the intermediate heat treatment is a non-oxidizing atmosphere (nitrogen gas atmosphere, inert gas atmosphere, reducing atmosphere).

Cooling conditions after the intermediate heat treatment are not particularly limited. Typically, cooling may be performed at a cooling rate of 2000° C./sec to 100° C./h.

Optionally, the intermediate plastic working S04 and the intermediate heat treatment S05 may be repeated multiple times.

[Finish Plastic Working: S06]

After the intermediate heat treatment step S05, finish working is performed to obtain a copper alloy having a final dimension (thickness, width, and length) and a final shape. The working method for the finish plastic working is not particularly limited. In a case in which the shape of the final product is in a plate or a strip, rolling (cold rolling) may be applied. In addition, depending on the shape of the final product, forging, pressing, groove rolling, or the like may be applied. The working ratio may be appropriately selected according to the final thickness and the final shape and is preferably in a range of 1% to 99% and more preferably in a range of 1% to 70%. When the working ratio is less than 1%, an effect of improving yield strength cannot be sufficiently obtained. On the other hand, when the working ratio exceeds 70%, the recrystallized structure is lost, and a worked structure is obtained. As a result, bendability may decrease. The working ratio is preferably 1% to 70% and more preferably 5% to 70%. After finish plastic working, the resultant may be used as a product without any change. However, typically, it is preferable that finish heat treatment is further performed.

[Finish Heat Treatment Step: S07]

After the finish plastic working, optionally, a finish heat treatment step S07 is performed to improve stress relaxation resistance and perform low-temperature annealing curing or to remove residual strain. It is preferable that this finish heat treatment is performed in a temperature range of 50° C. to 800° C. for 0.1 seconds to 24 hours. When the finish heat treatment temperature is lower than 50° C. or when the finish heat treatment time is shorter than 0.1 seconds, a sufficient straightening effect may not be obtained. On the other hand, when the finish heat treatment temperature exceeds 800° C., recrystallization may occur. When the finish heat treatment time exceeds 24 hours, the cost increases. When the finish plastic working S06 is not performed, the finish heat treatment step S07 can be omitted from the method of producing the copper alloy.

Through the above-described steps, the copper alloy for an electric and electronic device according to the embodiment can be obtained. In the copper alloy for an electric and electronic device, the 0.2% yield strength is 300 MPa or higher.

In addition, when rolling is used as a working method, a copper alloy sheet (strip) for an electric and electronic device having a thickness of about 0.05 mm to 1.0 mm can be obtained. This sheet may be used as the conductive component for an electric and electronic device without any change. However, typically, a single surface or both surfaces of the sheet are plated with Sn to have a thickness of 0.1 μm to 10 μm, and this Sn-plated copper alloy strip is used as a conductive component for an electric and electronic device such as a connector or other terminals. In this case, a Sn-plating method is not particularly limited. In addition, in some cases, a reflow treatment may be performed after electroplating.

In the copper alloy for an electric and electronic devices having the above-described configuration, a [Ni,Fe]—P-based precipitate or a [Ni,Fe,Co]—P-based precipitate which are precipitated from a matrix (mainly composed of α phase) and contain Fe, Ni, and P, is appropriately present. In addition to this, the fraction R{220} of the X-ray diffraction intensity ratio from the {220} plane on a surface (for example, an external surface of a sheet) of the copper alloy is limited to 0.8 or less. As a result, stress relaxation resistance is sufficiently superior, strength (yield strength) is high, and bendability is also superior.

Further, the copper alloy for an electric and electronic device according to the embodiment has mechanical properties including a 0.2% yield strength of 300 MPa or higher and thus is suitable for a conductive component in which high strength is particularly required, for example, a movable contact of an electromagnetic relay or a spring portion of a terminal.

The copper alloy sheet for an electric and electronic device according to the embodiment includes a rolled material formed of the above-described copper alloy for an electric and electronic device. Therefore, the copper alloy sheet for an electric and electronic device having the above-described configuration has superior stress relaxation resistance and can be suitably used for a connector, other terminals, a movable contact of an electromagnetic relay, or a lead frame.

In addition, when the surface of the copper alloy sheet is plated with Sn, a component such as a connector after use can be collected as scrap of a Sn-plated Cu—Zn alloy, and superior recycling efficiency can be secured.

Hereinabove, the embodiment of the present invention has been described. However, the present invention is not limited to the embodiment, and appropriate modifications can be made within a range not departing from the technical scope of the present invention.

For example, the example of the production method has been described, but the present invention is not limited thereto. The production method is not particularly limited as long as a copper alloy for an electric and electronic device as a final product has a composition in the range according to the present invention, and the fraction R{220} of the X-ray diffraction intensity ratio from the {220} plane on the surface of the copper alloy is set to be 0.8 or less.

Examples

Hereinafter, the results of an experiment which were performed in order to verify the effects of the present invention will be shown as Examples of the present invention together with Comparative Examples. The following Examples are to describe the effects of the present invention, and configurations, processes, and conditions described in Examples do not limit the technical scope of the present invention.

A raw material made up of a Cu-40% Zn master alloy and oxygen-free copper (ASTM B152 C10100) with a purity of 99.99 mass % or more was prepared. Then, these materials were set in a crucible made of high purity graphite and melted using an electric furnace in a $N_2$ gas atmosphere. A various elements were added into the molten copper alloy, thereby molten alloys having the component compositions shown in Tables 1, 2, and 3 were prepared and were poured into carbon molds to prepare ingots. The size of the ingots was about 40 mm (thickness)×about 50 mm (width)×about 200 mm (length).

Next, each ingot was subjected to a homogenization treatment (heating step S02), in which the ingots were held in a high purity Ar gas atmosphere at 800° C. for a predetermined amount of time and then were water-quenched.

Next, hot rolling was performed as the hot working S03. Each of the ingots was reheated such that the hot rolling start temperature was 800° C., was hot-rolled at a rolling reduction of 50% such that a width direction of the ingot was a rolling direction, and was water-quenched such that the rolling end temperature was 300° C. to 700° C. Next, the ingot was cut, and surface polishing was performed. As a result, a hot-rolled material having a size of about 15 mm (thickness)×about 160 mm (width)×about 100 mm (length).

Next, the intermediate plastic working S04 and the intermediate heat treatment step S05 were performed once or were repeatedly performed twice.

Specifically, when the intermediate plastic working and the intermediate heat treatment were performed once, cold rolling (intermediate plastic working) was performed at a rolling reduction of 90% or more. Next, as the intermediate heat treatment for recrystallization and precipitation treatment, a heat treatment was performed at 200° C. to 800° C. for a predetermined amount of time, and then water quenching was performed. After that, the rolled material was cut, and surface polishing was performed to remove an oxide film.

On the other hand, when the intermediate plastic working and the intermediate heat treatment were repeated twice, primary cold rolling (primary intermediate plastic working) was performed at a rolling reduction of about 50% to 90%. Next, as a primary intermediate heat treatment, a heat treatment was performed at 200° C. to 800° C. for a predetermined amount of time, and water quenching was performed. After that, secondary cold rolling (secondary intermediate plastic working) was performed at a rolling reduction of about 50% to 90%, a secondary intermediate heat treatment was performed at 200° C. to 800° C. for a predetermined amount of time, and then water quenching was performed. Next, the rolled material was cut, and surface polishing was performed to remove an oxide film.

After that, finish rolling was performed at a rolling reduction as shown in Tables 4, 5 and 6. During cold rolling in the present examples, rolling oil was applied to the surfaces and the amounts of the oil applied were adjusted.

Finally, a finish heat treatment was performed at 200° C. to 375° C., water quenching was performed, and cutting and surface-polishing were performed. As a result, a strip for characteristic evaluation having a size of 0.25 mm (thickness)×about 160 mm (width) was prepared.

Regarding the strip for characteristic evaluation, average grain size, mechanical properties, conductivity, and stress relaxation resistance were evaluated. Test methods and measurement methods for each evaluation item are as follows, and the results thereof are shown in Tables 4, 5, and 6.

[Grain Size Observation]

A surface perpendicular to the width direction of rolling, that is, a TD (transverse direction) surface was used as an observation surface. Using an EBSD measurement device and an OIM analysis software, grain boundaries and an orientation difference distribution were measured.

Mechanical polishing was performed using waterproof abrasive paper and diamond abrasive grains, and finish polishing was performed using a colloidal silica solution. Using an EBSD measurement device (QUANTA FEG 450 manufactured by FEI Company, OIM DATA COLLECTION manufactured by EDAX/TSL (at present, AMETEK Inc.)) and an analysis software (OIM DATA ANALYSIS Ver. 5.3 manufactured by EDAX/TSL (at present, AMETEK Inc.)), an orientation differences between crystal grains was analyzed under conditions of an acceleration voltage of electron beams of 20 kV, a measurement interval of 0.1 μm step, and a measurement area of 1000 μm$^2$ or more. The confidence index (CI) values of the measurement points were calculated from the analysis software OIM, and CI values of 0.1 or less were excluded by the analysis of the grain size. Grain boundaries were divided into a high-angle grain boundary and a low-angle grain boundary, in which, as a result of two-dimensional cross-sectional observation, the high-angle grain boundary had an orientation difference of 15° or more between two adjacent crystal grains, and the low-angle grain boundary had an orientation difference of 2° to 15° between two adjacent crystal grains. Using the high-angle grain boundary, a grain boundary map was created. Five line segments having predetermined horizontal and vertical lengths were drawn in the image according to a cutting method of JIS H 0501, the number of crystal grains which were completely cut was counted, and the average value of the cut lengths thereof was calculated as the average grain size.

In the examples, the average grain size defines the grains in a phase. In the above-described measurement of the average grain size, crystals in phases other than α phase, such as β phase, rarely existed. When such grains existed, the grains were excluded in the calculation of the average grain size.

[X-Ray Diffraction Intensity]

On the surface of each strip, the X-ray diffraction intensity I{111} from a {111} plane, the X-ray diffraction intensity I{200} from a {200} plane, the X-ray diffraction intensity I{220} from a {220} plane, and the X-ray diffraction intensity I{311} from a {311} plane are measured using a method described below. A measurement specimen was taken from the strip for characteristic evaluation and the X-ray diffraction intensity around one rotation axis was measured from the measurement specimen using a reflection method. Cu was used as a target and an X-ray of Kα was used. The X-ray diffraction intensity was measured under conditions of a tube current of 40 mA, tube voltage of 40 kV, a measurement angle in a range of 40° to 150°, and a measurement degree of 0.02°, the back ground of the X-ray diffraction intensity was removed in the profile of the diffraction angle and the X-ray diffraction intensity, then, the integrated X-ray diffraction intensity I obtained by combining Kα1 and Kα2 of peaks from individual diffraction surfaces was obtained, and the value of R{220} was obtained using the following expression:

$$R\{220\}=I\{220\}/(I\{111\}+I\{200\}+I\{220\}+I\{311\}).$$

[Mechanical Properties]

A No. 13B specified in JIS Z 2201 was collected from the strip for characteristic evaluation, and the 0.2% yield strength $\sigma_{0.2}$ using an offset method according to JIS Z 2241. The specimen was collected such that a tensile direction of a tensile test was perpendicular to the rolling direction of the strip for characteristic evaluation.

[Conductivity]

A specimen having a size of 10 mm (width)×60 mm (length) was collected from the strip for characteristic evaluation, and the electrical resistance thereof was obtained using a four-terminal method. In addition, using a micrometer, the size of the specimen was measured, and the volume of the specimen was calculated. The conductivity was calculated from the measured electrical resistance and the volume. The specimen was collected such that a longitudinal direction thereof was parallel to the rolling direction of the strip for characteristic evaluation.

[Bendability]

Bending was performed according to a test method of JCBA (Japan Copper and Brass Association) T307-2007-4. W bending was performed such that a bending axis was parallel to a rolling direction. Multiple specimens having a size of 10 mm (width)×30 mm (length)×0.25 mm (thickness) were collected from the strip for characteristic evaluation. Next, a W-bending test was performed using a W-shaped jig having a bending angle of 90° and a bending radius of 0.25 mm. A cracking test was performed using three samples. A case where no cracks were observed in four visual fields of each sample was evaluated as "A", and a case where cracks were observed in one or more visual fields of each sample was evaluated as "B".

[Stress Relaxation Resistance]

In a stress relaxation resistance test, using a method specified in a cantilever screw method of JCBA (Japan Copper and Brass Association)-T309:2004, a stress was applied to the specimen, the specimen was held under the following conditions (temperature and time), and then a residual stress ratio thereof was measured.

In the test method, a specimen (width: 10 mm) was collected from each of the strips for characteristic evaluation in a direction perpendicular to the rolling direction. An initial deflection displacement was set as 2 mm, and the span length was adjusted such that a surface maximum stress of the specimen was 80% of the yield strength. The surface maximum stress was determined from the following expression.

Surface Maximum Stress(MPa)=$1.5Et\delta_0/L_s^2$ (wherein E: deflection coefficient (MPa), t: thickness of sample (t=0.25 mm), $\delta_0$: initial deflection displacement (2 mm), $L_s$: span length (mm))

In the evaluation of stress relaxation resistance, the residual stress rate was measured from the bent portion after the test piece was held for 500 hours at a temperature of 120° C. to evaluate stress relaxation resistance. The residual stress ratio was calculated using the following expression.

Residual Stress Ratio(%)=$(1-\delta_t/\delta_0)\times 100$ (wherein $\delta_t$: permanent deflection displacement (mm) after holding at 120° C. for 500 h—permanent deflection displacement (mm) after holding at room temperature for 24 h, $\delta_0$: initial deflection displacement (mm))

A case where the residual stress ratio was 70% or more was evaluated to be favorable (A), and a case where the residual stress ratio was less than 70% was evaluated to be poor (B).

No. 1 was Examples of the present invention in which a Cu-35Zn alloy containing about 35% of Zn was based. Nos. 2 to 15 were an Examples of the present invention in which a Cu-30Zn alloy containing about 30% of Zn was based. Nos. 16 to 28 were Examples of the present invention in which a Cu-25Zn alloy containing about 25% of Zn was based.

In addition, No. 51 was a Comparative Example in which Zn content exceeded the upper limit of the range of the present invention, and Nos. 52 to 55 were Comparative Examples in which a Cu-30Zn alloy containing about 30% of Zn was based.

TABLE 1

| | [Examples of Present Invention] | | | | | | | | |
|---|---|---|---|---|---|---|---|---|---|
| | Alloy Component Composition | | | | | | | Atomic Ratios of Alloy Elements | | |
| | Addition Elements (mass %) | | | | | | | Atomic Ratio | Atomic Ratio | Atomic Ratio |
| No. | Zn | Sn | Ni | Fe | P | Co | Cu | (Fe + Co)/Ni | (Ni + Fe + Co)/P | Sn/(Ni + Fe + Co) |
| 1 | 36.3 | 0.55 | 0.52 | 0.054 | 0.046 | — | Balance | 0.109 | 6.6 | 0.5 |
| 2 | 30.8 | 0.64 | 0.55 | 0.044 | 0.060 | — | Balance | 0.084 | 5.2 | 0.5 |

TABLE 1-continued

[Examples of Present Invention]

| | Alloy Component Composition | | | | | | | Atomic Ratios of Alloy Elements | | |
| --- | --- | --- | --- | --- | --- | --- | --- | --- | --- | --- |
| | Addition Elements (mass %) | | | | | | | Atomic Ratio | Atomic Ratio | Atomic Ratio |
| No. | Zn | Sn | Ni | Fe | P | Co | Cu | (Fe + Co)/Ni | (Ni + Fe + Co)/P | Sn/(Ni + Fe + Co) |
| 3 | 30.8 | 0.64 | 0.55 | 0.044 | 0.060 | — | Balance | 0.084 | 5.2 | 0.5 |
| 4 | 29.0 | 0.25 | 0.32 | 0.032 | 0.061 | — | Balance | 0.105 | 3.1 | 0.3 |
| 5 | 27.3 | 0.66 | 0.72 | 0.059 | 0.052 | — | Balance | 0.086 | 7.9 | 0.4 |
| 6 | 27.7 | 0.61 | 0.86 | 0.035 | 0.061 | — | Balance | 0.043 | 7.8 | 0.3 |
| 7 | 27.1 | 0.43 | 0.33 | 0.051 | 0.065 | — | Balance | 0.162 | 3.1 | 0.6 |
| 8 | 27.6 | 0.58 | 0.49 | 0.001 | 0.044 | — | Balance | 0.002 | 5.9 | 0.6 |
| 9 | 30.8 | 0.61 | 0.47 | 0.002 | 0.062 | — | Balance | 0.004 | 4.0 | 0.6 |
| 10 | 29.9 | 0.55 | 0.51 | 0.074 | 0.025 | — | Balance | 0.152 | 12.3 | 0.5 |
| 11 | 27.6 | 0.65 | 0.65 | 0.040 | 0.079 | — | Balance | 0.065 | 4.6 | 0.5 |
| 12 | 31.8 | 0.62 | 0.63 | 0.021 | 0.059 | — | Balance | 0.035 | 5.8 | 0.5 |
| 13 | 31.7 | 0.55 | 0.57 | 0.001 | 0.059 | 0.001 | Balance | 0.004 | 5.1 | 0.5 |
| 14 | 30.0 | 0.61 | 0.60 | 0.002 | 0.057 | 0.002 | Balance | 0.007 | 5.6 | 0.5 |
| 15 | 32.1 | 0.62 | 0.55 | 0.020 | 0.047 | 0.034 | Balance | 0.100 | 6.9 | 0.5 |

TABLE 2

[Examples of Present Invention]

| | Alloy Component Composition | | | | | | | Atomic Ratios of Alloy Elements | | |
| --- | --- | --- | --- | --- | --- | --- | --- | --- | --- | --- |
| | Addition Elements (mass %) | | | | | | | Atomic Ratio | Atomic Ratio | Atomic Ratio |
| No. | Zn | Sn | Ni | Fe | P | Co | Cu | (Fe + Co)/Ni | (Ni + Fe + Co)/P | Sn/(Ni + Fe + Co) |
| 16 | 26.9 | 0.60 | 0.52 | 0.019 | 0.045 | — | Balance | 0.038 | 6.4 | 0.5 |
| 17 | 24.9 | 0.60 | 0.57 | 0.022 | 0.046 | — | Balance | 0.041 | 6.8 | 0.5 |
| 18 | 25.5 | 0.60 | 0.41 | 0.017 | 0.067 | 0.021 | Balance | 0.095 | 3.6 | 0.7 |
| 19 | 23.4 | 0.25 | 0.34 | 0.029 | 0.060 | — | Balance | 0.090 | 3.2 | 0.3 |
| 20 | 26.1 | 0.86 | 0.31 | 0.051 | 0.037 | — | Balance | 0.173 | 5.2 | 1.2 |
| 21 | 23.1 | 0.90 | 0.15 | 0.028 | 0.031 | — | Balance | 0.196 | 3.1 | 2.5 |
| 22 | 23.2 | 0.65 | 0.82 | 0.029 | 0.067 | — | Balance | 0.037 | 6.7 | 0.4 |
| 23 | 25.0 | 0.50 | 0.50 | 0.001 | 0.051 | — | Balance | 0.002 | 5.2 | 0.5 |
| 24 | 23.0 | 0.52 | 0.64 | 0.002 | 0.053 | — | Balance | 0.003 | 6.4 | 0.4 |
| 25 | 26.4 | 0.59 | 0.15 | 0.088 | 0.044 | 0.011 | Balance | 0.690 | 3.0 | 1.2 |
| 26 | 26.6 | 0.71 | 0.57 | 0.036 | 0.074 | — | Balance | 0.066 | 4.3 | 0.6 |
| 27 | 27.1 | 0.53 | 0.59 | 0.037 | 0.061 | 0.001 | Balance | 0.068 | 5.5 | 0.4 |
| 28 | 25.8 | 0.55 | 0.50 | 0.034 | 0.053 | 0.002 | Balance | 0.075 | 5.3 | 0.5 |

TABLE 3

[Comparative Example]

| | Alloy Component Composition | | | | | | | Atomic Ratios of Alloy Elements | | |
| --- | --- | --- | --- | --- | --- | --- | --- | --- | --- | --- |
| | Addition Elements (mass %) | | | | | | | Atomic Ratio | Atomic Ratio | Atomic Ratio |
| No. | Zn | Sn | Ni | Fe | P | Co | Cu | (Fe + Co)/Ni | (Ni + Fe + Co)/P | Sn/(Ni + Fe + Co) |
| 51 | 37.3 | 0.86 | 0.51 | 0.049 | 0.065 | — | Balance | 0.101 | 4.6 | 0.8 |
| 52 | 28.5 | 0.51 | 0.20 | 0.075 | 0.045 | — | Balance | 0.394 | 3.3 | 0.9 |
| 53 | 32.6 | 0.14 | — | 0.049 | 0.023 | — | Balance | — | 1.2 | 1.3 |
| 54 | 29.4 | — | 0.06 | — | 0.018 | — | Balance | 0.000 | 1.8 | 0.0 |
| 55 | 29.3 | 0.48 | — | — | — | — | Balance | — | — | — |

TABLE 4

[Examples of Present Invention]

| | Steps | | | | Evaluation | | | | | |
|---|---|---|---|---|---|---|---|---|---|---|
| | | Hot Rolling | Finish | Finish Heat | | | | | | |
| No. | Homogenization Temperature (° C.) | Start Temperature (° C.) | Rolling Reduction (%) | Treatment Temperature (° C.) | Grain Size (μm) | R{220} | Conductivity (% IACS) | Yield Strength (MPa) | Bendability | Stress Relaxation Resistance |
|---|---|---|---|---|---|---|---|---|---|---|
| 1 | 800 | 800 | 25 | 300 | 4.1 | 0.76 | 21% | 565 | A | A |
| 2 | 800 | 800 | 19 | 325 | 2.5 | 0.70 | 21% | 527 | A | A |
| 3 | 800 | 800 | 35 | 325 | 2.0 | 0.77 | 21% | 592 | A | A |
| 4 | 800 | 800 | 34 | 300 | 2.1 | 0.76 | 23% | 564 | A | A |
| 5 | 800 | 800 | 24 | 375 | 2.0 | 0.70 | 21% | 565 | A | A |
| 6 | 800 | 800 | 19 | 375 | 1.9 | 0.68 | 21% | 587 | A | A |
| 7 | 800 | 800 | 23 | 300 | 2.4 | 0.69 | 23% | 572 | A | A |
| 8 | 800 | 800 | 24 | 350 | 1.7 | 0.70 | 23% | 567 | A | A |
| 9 | 800 | 800 | 25 | 325 | 1.9 | 0.73 | 22% | 564 | A | A |
| 10 | 800 | 800 | 23 | 300 | 2.2 | 0.71 | 21% | 573 | A | A |
| 11 | 800 | 800 | 24 | 350 | 2.5 | 0.70 | 22% | 567 | A | A |
| 12 | 800 | 800 | 24 | 350 | 2.5 | 0.73 | 21% | 567 | A | A |
| 13 | 800 | 800 | 26 | 325 | 1.6 | 0.74 | 21% | 563 | A | A |
| 14 | 800 | 800 | 26 | 300 | 1.9 | 0.73 | 22% | 564 | A | A |
| 15 | 800 | 800 | 26 | 300 | 1.7 | 0.74 | 21% | 563 | A | A |

TABLE 5

[Examples of Present Invention]

| | Steps | | | | Evaluation | | | | | |
|---|---|---|---|---|---|---|---|---|---|---|
| | | Hot Rolling | Finish | Finish Heat | | | | | | |
| No. | Homogenization Temperature (° C.) | Start Temperature (° C.) | Rolling Reduction (%) | Treatment Temperature (° C.) | Grain Size (μm) | R{220} | Conductivity (% IACS) | Yield Strength (MPa) | Bendability | Stress Relaxation Resistance |
|---|---|---|---|---|---|---|---|---|---|---|
| 16 | 800 | 800 | 21 | 325 | 2.6 | 0.68 | 22% | 561 | A | A |
| 17 | 800 | 800 | 42 | 375 | 2.0 | 0.79 | 23% | 596 | A | A |
| 18 | 800 | 800 | 21 | 350 | 2.1 | 0.67 | 23% | 566 | A | A |
| 19 | 800 | 800 | 24 | 300 | 2.2 | 0.67 | 24% | 556 | A | A |
| 20 | 800 | 800 | 20 | 300 | 2.1 | 0.67 | 22% | 567 | A | A |
| 21 | 800 | 800 | 26 | 325 | 2.2 | 0.68 | 24% | 573 | A | A |
| 22 | 800 | 800 | 29 | 350 | 1.9 | 0.69 | 21% | 568 | A | A |
| 23 | 800 | 800 | 27 | 300 | 1.8 | 0.70 | 23% | 567 | A | A |
| 24 | 800 | 800 | 25 | 350 | 2.1 | 0.68 | 22% | 567 | A | A |
| 25 | 800 | 800 | 31 | 325 | 2.4 | 0.73 | 23% | 564 | A | A |
| 26 | 800 | 800 | 29 | 350 | 2.0 | 0.72 | 22% | 582 | A | A |
| 27 | 800 | 800 | 27 | 325 | 2.0 | 0.71 | 22% | 574 | A | A |
| 28 | 800 | 800 | 27 | 300 | 2.3 | 0.70 | 22% | 571 | A | A |

TABLE 6

[Comparative Example]

| | Steps | | | | Evaluation | | | | | |
|---|---|---|---|---|---|---|---|---|---|---|
| | | Hot Rolling | Finish | Finish Heat | | | | | | |
| No. | Homogenization Temperature (° C.) | Start Temperature (° C.) | Rolling Reduction (%) | Treatment Temperature (° C.) | Grain Size (μm) | R{220} | Conductivity (% IACS) | Yield Strength (MPa) | Bendability | Stress Relaxation Resistance |
|---|---|---|---|---|---|---|---|---|---|---|
| 51 | 800 | 800 | — | — | — | — | — | — | — | — |
| 52 | 800 | 800 | 89 | 200 | — | 0.93 | 22% | — | B | — |
| 53 | 800 | 800 | 20 | 200 | 1.8 | 0.72 | 22% | 532 | A | B |
| 54 | 800 | 800 | 16 | 200 | 2.1 | 0.68 | 26% | 495 | A | B |
| 55 | 800 | 800 | 20 | 200 | 1.9 | 0.69 | 25% | 490 | A | B |

In Comparative Example No. 51, the Zn content was as high as 37.3 mass % and cracking occurred during cold-rolling. Therefore, evaluations thereafter were stopped.

Comparative Example No. 52 was a Cu-30Zn-based alloy having an X-ray diffraction intensity ratio R{220} of the {220} plane on the surface of 0.93 and had poorer bendability than the Cu-30Zn-based alloy of the Examples of present invention.

Comparative Example No. 53 was a Cu-30Zn-based alloy to which Ni, was not added and had poorer stress relaxation resistance than the Cu-30Zn-based alloy of the Examples of present invention.

Comparative Example No. 54 was a Cu-30Zn-based alloy to which Sn and Fe were not added and had poorer stress relaxation resistance than the Cu-30Zn-based alloy of the Examples of present invention.

Comparative Example No. 55 was a Cu-30Zn-based alloy to which Ni, Fe, and P were not added and had poorer stress relaxation resistance than the Cu-30Zn-based alloy of the Examples of present invention.

On the other hand, in Examples No. 1 to 28 of the present invention, each content of the respective alloy elements was in the range defined in the present invention, the ratios between the alloy elements were in the range defined in the present invention, and the X-ray diffraction intensity ratio R{220} of the {220} plane on the surface was set in the range defined in the present invention. As a result, it was verified that the stress relaxation resistance was superior, conductivity, yield strength, and bendability was good, and applicability to a connector or other terminal members is sufficient.

INDUSTRIAL APPLICABILITY

The copper alloy of the present invention is easily decreased in thickness and has excellent balance between yield strength and bendability, and thus can be used as a material for conductive components for an electric and electronic device on which strict bending is carried out. In addition, the copper alloy of the present invention has excellent stress relaxation resistance, and thus it is possible to maintain the contact pressure with other members in a conductive component for an electric and electronic device for a long period of time. The present invention is capable of providing the above-described copper alloy for an electric and electronic device, a copper alloy sheet for which the copper alloy for an electric and electronic device is used, and a conductive component for an electric and electronic device or a terminal.

The invention claimed is:

1. A copper alloy for electric and electronic devices, the copper alloy comprising:
   23 mass % to 36.5 mass % of Zn;
   0.1 mass % to 0.9 mass % of Sn;
   0.2 mass % to less than 1.0 mass % of Ni;
   0.001 mass % to less than 0.10 mass % of Fe;
   0.005 mass % to 0.1 mass % of P; and
   a balance including Cu and unavoidable impurities,
   wherein a ratio Fe/Ni of a Fe content to a Ni content satisfies 0.002≤Fe/Ni<0.7 by atomic ratio,
   a ratio (Ni+Fe)/P of a total content (Ni+Fe) of Ni and Fe to a P content satisfies 3<(Ni+Fe)/P<15 by atomic ratio,
   a ratio Sn/(Ni+Fe) of a Sn content to the total content (Ni+Fe) of Ni and Fe satisfies 0.3<Sn/(Ni+Fe)<2.9 by atomic ratio, and
   R{220} is 0.8 or less, wherein an X-ray diffraction intensity from a {111} plane on a surface of the copper alloy is represented by I{111}, an X-ray diffraction intensity from a {200} plane on the surface of the copper alloy is represented by I{200}, an X-ray diffraction intensity from a {220} plane on the surface of the copper alloy is represented by I{220}, an X-ray diffraction intensity from a {311} plane on the surface of the copper alloy is represented by I{311}, and a fraction R{220} of the X-ray diffraction intensity from the {220} plane on the surface of the copper alloy is $$R\{220\}=I\{220\}/(I\{111\}+I\{200\}+I\{220\}+I\{311\}).$$

2. The copper alloy for electric and electronic devices according to claim 1,
   wherein the R{220} is in a range of 0.3 to 0.8.

3. The copper alloy for electric and electronic devices according to claim 1,
   wherein the copper alloy has mechanical properties including a 0.2% yield strength of 300 MPa or higher.

4. The copper alloy for electric and electronic devices according to claim 2,
   wherein the copper alloy has mechanical properties including a 0.2% yield strength of 300 MPa or higher.

5. A copper alloy sheet for electric and electronic devices, comprising:
   a sheet main body made of a rolled material formed of the copper alloy for electric and electronic devices according to claim 1,
   wherein a thickness of the sheet main body is in a range of 0.05 mm to 1.0 mm.

6. A conductive component for electric and electronic devices comprising:
   the copper alloy sheet for electric and electronic devices according to claim 5.

7. A terminal comprising:
   the copper alloy sheet for electric and electronic devices according to claim 5.

8. The copper alloy sheet for electric and electronic devices according to claim 5, further comprising:
   a Sn-plated layer formed on a surface of the sheet main body.

9. A conductive component for electric and electronic devices comprising:
   the copper alloy sheet for electric and electronic devices according to claim 8.

10. A terminal comprising:
    the copper alloy sheet for electric and electronic devices according to claim 8.

11. A conductive component for electric and electronic devices comprising:
    the copper alloy for electric and electronic devices according to claim 1.

12. A terminal comprising:
    the copper alloy for electric and electronic devices according to claim 1.

13. A copper alloy for electric and electronic devices, comprising:
    23 mass % to 36.5 mass % of Zn;
    0.1 mass % to 0.9 mass % of Sn;
    0.2 mass % to less than 1.0 mass % of Ni;
    0.001 mass % to less than 0.10 mass % of Fe;
    0.001 mass % to less than 0.1 mass % of Co;
    0.005 mass % to 0.1 mass % of P; and
    a balance including Cu and unavoidable impurities,
    wherein a ratio (Fe+Co)/Ni of a total content of Fe and Co to a Ni content satisfies 0.002≤(Fe+Co)/Ni<0.7 by atomic ratio, a ratio (Ni+Fe+Co)/P of a total content (Ni+Fe+Co) of Ni, Fe, and Co to a P content satisfies 3<(Ni+Fe+Co)/P<15 by atomic ratio, a ratio Sn/(Ni+Fe+Co) of a Sn content to the total content (Ni+Fe+Co) of Ni, Fe, and Co satisfies 0.3<Sn/(Ni+Fe+Co)<2.9 by atomic ratio, and R{220} is 0.8 or less, wherein an X-ray diffraction intensity from a {111} plane on a surface of the copper alloy is represented by I{111}, an X-ray diffraction intensity from a {200} plane on the surface of the copper alloy is represented by I{200}, an X-ray diffraction intensity from a {220} plane on the surface of the copper alloy is represented by I{220}, an X-ray diffraction intensity from a {311} plane on the surface of the copper alloy is represented by I{311}, and a fraction R{220} of the X-ray diffraction intensity from the {220} plane on the surface of the copper alloy is $$R\{220\}=I\{220\}/(I\{111\}+I\{200\}+I\{220\}+I\{311\}).$$

14. The copper alloy for electric and electronic devices according to claim 13,
wherein the R{220} is in a range of 0.3 to 0.8.

15. The copper alloy for electric and electronic devices according to claim 13,
wherein the copper alloy has mechanical properties including a 0.2% yield strength of 300 MPa or higher.

16. The copper alloy for electric and electronic devices according to claim 14,
wherein the copper alloy has mechanical properties including a 0.2% yield strength of 300 MPa or higher.

* * * * *